US012571507B2

(12) United States Patent
Berreth

(10) Patent No.: US 12,571,507 B2
(45) Date of Patent: Mar. 10, 2026

(54) HANDS FREE FLASHLIGHT DEVICE

(71) Applicant: Gary Berreth, Coeur D Alene, ID (US)

(72) Inventor: Gary Berreth, Coeur D Alene, ID (US)

( * ) Notice: Subject to any disclaimer, the term of this patent is extended or adjusted under 35 U.S.C. 154(b) by 0 days.

(21) Appl. No.: 19/002,004

(22) Filed: Dec. 26, 2024

(65) Prior Publication Data

US 2025/0347394 A1 Nov. 13, 2025

Related U.S. Application Data

(60) Provisional application No. 63/643,459, filed on May 7, 2024.

(51) Int. Cl.

| | |
|---|---|
| ***F21L 4/08*** | (2006.01) |
| ***F21L 4/02*** | (2006.01) |
| ***F21V 21/084*** | (2006.01) |
| ***F21V 21/096*** | (2006.01) |
| ***F21V 21/14*** | (2006.01) |
| ***F21V 21/16*** | (2006.01) |
| ***F21V 23/04*** | (2006.01) |
| ***F21V 23/06*** | (2006.01) |
| ***F21V 31/00*** | (2006.01) |
| ***F21V 31/04*** | (2006.01) |
| ***F21Y 101/00*** | (2016.01) |
| ***F21Y 115/10*** | (2016.01) |

(52) U.S. Cl.

CPC ............... *F21L 4/085* (2013.01); *F21L 4/027* (2013.01); *F21V 21/084* (2013.01); *F21V 21/0965* (2013.01); *F21V 21/145* (2013.01); *F21V 21/16* (2013.01); *F21V 23/0414* (2013.01); *F21V 23/06* (2013.01); *F21V 31/005* (2013.01); *F21V 31/04* (2013.01); *F21Y 2101/00* (2013.01); *F21Y 2115/10* (2016.08)

(58) Field of Classification Search

CPC .......... F21L 4/00–085; F21V 21/08–16; F21V 23/04–06; F21V 31/00–04; F21Y 2101/00; F21Y 2115/10

See application file for complete search history.

(56) References Cited

U.S. PATENT DOCUMENTS

| | | | | |
|---|---|---|---|---|
| 2,244,288 A * | 6/1941 | Colby | F21L 4/00 224/181 |
| 5,226,712 A * | 7/1993 | Lucas | F21V 23/0414 362/108 |
| 7,972,024 B2 * | 7/2011 | DeLeeuw | F21V 21/0885 433/29 |
| 9,863,631 B1 * | 1/2018 | Storer | F21L 4/08 |
| 11,229,508 B2 * | 1/2022 | Whitney | A61C 19/066 |

* cited by examiner

*Primary Examiner* — Jason M Han

(74) *Attorney, Agent, or Firm* — Brennan, Manna & Diamond, LLC

(57) ABSTRACT

A hands-free flashlight device is disclosed, wherein the device is a small, fluorescent flashlight with a silicone area that can be held in a user's mouth. The device hangs on a string around a user's neck and can be activated via a push button. The housing component of the device is long and flat and sized to be placed in a user's mouth. The housing component includes four LEDs to illuminate an area. The device is waterproof and rechargeable and can have a magnet for storage purposes. Users can hold the flashlight in their mouth and utilize the light hands-free to illuminate different areas.

14 Claims, 3 Drawing Sheets

HANDS FREE FLASHLIGHT DEVICE

CROSS-REFERENCE TO RELATED APPLICATION

The present application claims priority to, and the benefit of, U.S. Provisional Application No. 63/643,459, which was filed on May 7, 2024, and is incorporated herein by reference in its entirety.

FIELD OF THE INVENTION

The present invention relates generally to the field of hands-free flashlight devices. More specifically, the present invention relates to a hands-free flashlight that can be held in the mouth, utilizing a silicone covering to prevent any injury or discomfort to the teeth. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in hands-free flashlight devices. Generally, people may need to use a flashlight to work on different projects, especially when working on vehicles. Holding a flashlight in one hand leaves only one other hand free for working. Most jobs require more than one hand to complete. Thus, users must find a place to set the flashlight in order to perform the required task.

Further, when using miniature flashlights, people may temporarily put it in their mouth to maintain a hands-free working environment, however, this can be uncomfortable and can lead to chipped teeth. Additionally, having to place a cylindrical shaped flashlight in one's mouth is not only uncomfortable, but can be very difficult to keep hold of. Generally, the flashlight will fall out of one's mouth and can become lost on the ground or may fall to where the user cannot reach it.

Accordingly, there is a demand for an improved hands-free flashlight device that allows users to hold the device in their mouths without discomfort. More particularly, there is a demand for a hands-free flashlight device that saves time and effort when working in dark spaces.

Therefore, there exists a long felt need in the art for a hands-free flashlight device that provides users with a hands-free flashlight that can be held in the mouth. There is also a long felt need in the art for a hands-free flashlight device that utilizes a silicone covering to prevent any injury or discomfort to the teeth. Further, there is a long felt need in the art for a hands-free flashlight device that enables users to hold the flashlight in their mouth via the silicone area without damaging their teeth. Moreover, there is a long felt need in the art for a device that maintains hands-free operation of the flashlight to keep both hands-free for different tasks while working. Further, there is a long felt need in the art for a hands-free flashlight device that saves time and effort when working underneath vehicles, in dark or tight spaces, and other situations that require a flashlight. Finally, there is a long felt need in the art for a hands-free flashlight device that includes an optional magnet for storage purposes.

The subject matter disclosed and claimed herein, in one embodiment thereof, comprises a hands-free flashlight device. The device is a small, fluorescent flashlight with a silicone area that can be held in a user's mouth. The device hangs on a string around a user's neck and can be activated via a push button. The housing component of the device is long and flat and sized to be placed in a user's mouth. The housing component includes four LEDs to illuminate an area. The device is waterproof and rechargeable and can have a magnet for storage purposes. Users can hold the flashlight in their mouth and utilize the light hands-free to illuminate different areas.

In this manner, the hands-free flashlight device of the present invention accomplishes all of the forgoing objectives and provides users with a device that can be held in a user's mouth comfortably. The device is a flashlight with a smooth, silicone area. The device can comprise a magnet for storage purposes.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a hands-free flashlight device. The device is a small, fluorescent flashlight with a silicone area that can be held in a user's mouth. The device hangs on a string around a user's neck and can be activated via a push button. The housing component includes four LEDs to illuminate an area. The device is waterproof and rechargeable and can have a magnet for storage purposes. Users can hold the flashlight in their mouth and utilize the light hands-free to illuminate different areas.

In one embodiment, the hands-free flashlight device allows users to hold the device comfortably in their mouths, while working hands-free. Thus, the device maintains hands-free operation while allowing a user to work underneath vehicles, in dark or tight spaces, and other situations that require a flashlight. Accordingly, the hands-free flashlight device saves a user time and effort when performing a job that requires use of a flashlight.

In one embodiment, the hands-free flashlight device comprises a housing component in a generally rectangular configuration, which is an elongated and flattened shape. The opposing side ends of the housing component are indented inward, such that a user's mouth can easily fit around the housing component. Specifically, once in place within a user's mouth, the indentations intersect with a user's lips. Further, the housing component comprises opposing top and bottom sides, with the top side sized to be more elongated than the bottom side. Specifically, the top side measures approximately between 1-2 inches and the bottom side measures approximately between ½-1 inch in size, depending on the needs and/or wants of a user. Further, the body component can be available in a variety of sizes, depending on the needs and/or wants of a user.

In one embodiment, the bottom side also includes a dimple for a user's tongue. Thus, once the device is in place between a user's teeth and lips, the user's tongue then rests against the dimple for comfortable placement of the device, during use.

In one embodiment, the housing component is manufactured of a plastic material and encases the flashlight components ensuring the device is waterproof and to prevent damage of the device. In another embodiment, the housing component is encased in a silicone material which offers durability and a soft area for a user's mouth, teeth, and lips during use. In one embodiment, the housing component comprises a silicone area. In another embodiment, the entire housing component is encased with a silicone material, which also maintains the waterproofness of the device and its components.

In one embodiment, the housing component can be molded in various colors and patterns, depending on the needs and/or wants of a user. Typically, the housing component is produced in various fluorescent colors, based upon a user's preference.

In one embodiment, the housing component comprises an internal battery, which may be a standard battery or may be rechargeable. If a rechargeable battery is used, a USB port may be provided to allow the user to plug a charging cable into the port to charge the internal battery as is known in the art. In one embodiment, the USB port automatically closes when the charging cable is unplugged and removed. Thus, when not in use, the housing component can be recharged via the USB port and charging cable, as needed. Typically, the USB port can recharge the internal battery and maintain function of the flashlight device throughout several uses before needing recharged again. In another embodiment, the internal battery is a standard battery and can be removed from the housing component and replaced with new batteries, as needed.

In one embodiment, the housing component comprises a light bulb, a power switch, and conducting wires/circuits for illuminating objects with the device. Additionally, the light bulb may be an LED light, incandescent, CFL or any other suitable light source capable of operating on a battery charge for a reasonable length of time and generally producing approximately between 40-60 lumens. Typically, the light bulb is at least one LED light, more specifically, there are four LEDs encased within the top side of the housing component to illuminate an area. Further, the LED bulb is actuated by a push or slide button that connects the circuit between the negative side of the battery to the LED bulb that fits against the positive end of the battery, to illuminate the LED bulb. Thus, the housing component has the ability to generate a light beam in a specific area. Generally, the illuminated end portion directs light to a specific area during use of the hands-free flashlight device.

In one embodiment, the housing component comprises a string, strap, lanyard, etc., or any other suitable strap which is secured via being tied to a hole in the housing component, glued, adhesives, etc. The string allows a user to hang the flashlight device around a user's neck when not in use, then to place the device in a user's mouth when needed.

In one embodiment, the hands-free flashlight device comprises a magnetic strip or area that is secured via adhesives, glue, etc., to the housing component, allowing a user to store the device on a magnetic surface when not in use.

In yet another embodiment, the hands-free flashlight device comprises a plurality of indicia.

In yet another embodiment, a method of comfortably holding a flashlight in a user's mouth is disclosed. The method includes the steps of providing a hands-free flashlight device comprising a housing component with a silicone area. The method also comprises hanging the flashlight device around a user's neck via a string. Further, the method comprises turning on the flashlight device via pushing the power button. The method also comprises placing the housing component within a user's mouth. Finally, the method comprises illuminating a desired area via the flashlight device and being able to work hands-free.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
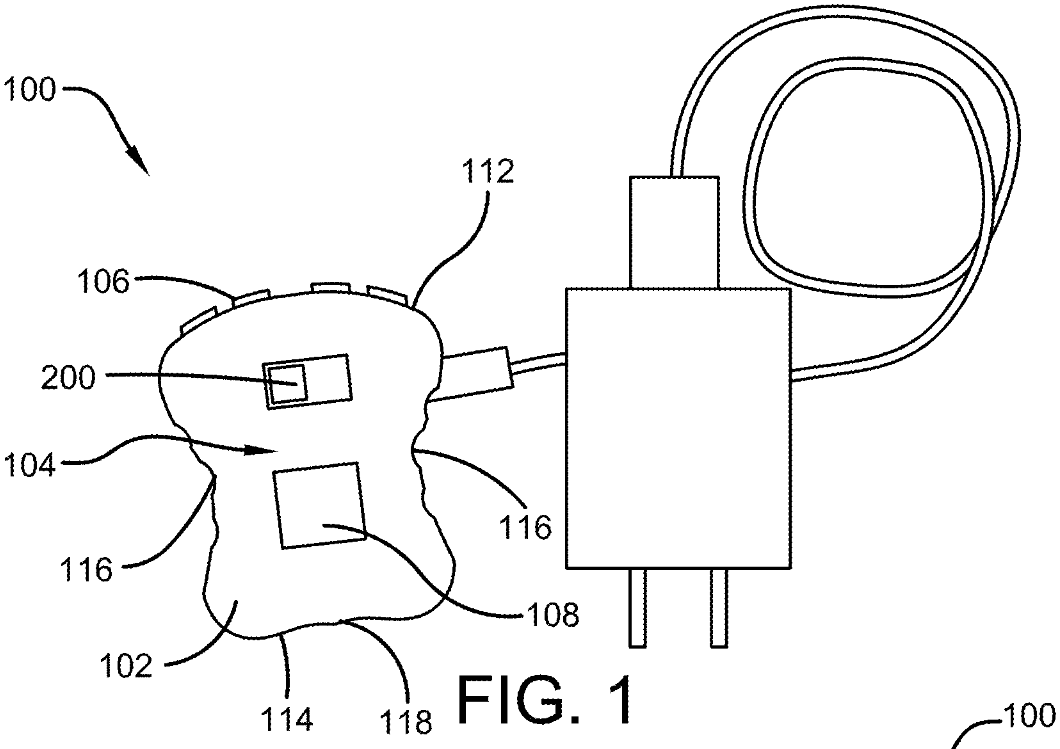
FIG. 1 illustrates a perspective view of one embodiment of the hands-free flashlight device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a hands-free flashlight device that provides users with a hands-free flashlight that can be held in the mouth. There is also a long felt need in the art for a hands-free flashlight device that utilizes a silicone covering to prevent any injury or discomfort to the teeth. Further, there is a long felt need in the art for a hands-free flashlight device that enables users to hold the flashlight in their mouth via the silicone area without damaging their teeth. Moreover, there is a long felt need in the art for a device that maintains hands-free operation of the flashlight to keep both hands-free for different tasks while working. Further, there is a long felt need in the art for a hands-free flashlight device that saves time and effort when working underneath vehicles, in dark or tight spaces, and other situations that require a flashlight. Finally, there is a long felt need in the art for a hands-free flashlight device that includes an optional magnet for storage purposes.

The present invention, in one exemplary embodiment, is a novel hands-free flashlight device. The device is a small, fluorescent flashlight with a silicone area that can be held in a user's mouth. The device hangs on a string around a user's neck and can be activated via a push button. The housing component of the device is long and flat and sized to be placed in a user's mouth. The housing component includes four LEDs to illuminate an area. The device is waterproof and rechargeable and can have a magnet for storage purposes. The present invention also includes a novel method of comfortably holding a flashlight in a user's mouth. The method includes the steps of providing a hands-free flashlight device comprising a housing component with a silicone area. The method also comprises hanging the flashlight device around a user's neck via a string. Further, the method comprises turning on the flashlight device via pushing the power button. The method also comprises placing the housing component within a user's mouth. Finally, the method comprises illuminating a desired area via the flashlight device and being able to work hands-free.

Referring initially to the drawings, FIG. 1 illustrates a perspective view of one embodiment of the hands-free flashlight device 100 of the present invention. In the present embodiment, the hands-free flashlight device 100 is an improved hands-free flashlight device 100 that provides a user with a flashlight that can be comfortably held in one's mouth. Specifically, the hands-free flashlight device 100 comprises a housing component 102 with a silicone area 104. The housing component 102 includes four LEDs 106 to illuminate an area. The device 100 is waterproof and rechargeable and can have a magnet 108 for storage purposes. Users can hold the flashlight device 100 in their mouth and utilize the light hands-free to illuminate different areas.

Generally, the hands-free flashlight device 100 allows users to hold the device 100 comfortably in their mouths, while working hands-free. Thus, the device 100 maintains hands-free operation while allowing a user to work underneath vehicles, in dark or tight spaces, and other situations that require a flashlight. Accordingly, the hands-free flashlight device 100 saves a user time and effort when performing a job that requires use of a flashlight.

Further, the hands-free flashlight device 100 comprises a housing component 102 in a generally rectangular configuration, which is an elongated and flattened shape. The opposing side ends 110 of the housing component 102 are indented inward, such that a user's mouth can easily fit around the housing component 102. Specifically, once in place within a user's mouth, the indentations 116 intersect with a user's lips. Further, the housing component 102 comprises opposing top 112 and bottom 114 sides, with the top side 112 sized to be more elongated than the bottom side 114. Specifically, the top side 112 measures approximately between 1-2 inches and the bottom side 114 measures approximately between ½-1 inch in size, depending on the needs and/or wants of a user. Further, the housing component 102 can be available in a variety of sizes, depending on the needs and/or wants of a user.

Additionally, the bottom side 114 also includes a dimple 118 for a user's tongue. Thus, once the device 100 is in place between a user's teeth and lips, the user's tongue then rests against the dimple 118 for comfortable placement of the device 100, during use.

Furthermore, the housing component 102 is manufactured of a plastic material and encases the flashlight components ensuring the device 100 is waterproof and to prevent damage of the device 100. Specifically, the device 100 can be manufactured from heat-sealable plastic or polymers, such as polypropylene or acrylonitrile-butadiene-styrene (ABS), or any other suitable material as is known in the art, such as but not limited to, polyethylene, polyethylene terephthalate, polyvinyl chloride, polystyrene, etc. Generally, the hands-free flashlight device 100 is also manufactured from a material that is water resistant or waterproof, or the housing component 102 comprises a coating that is water resistant or waterproof. Furthermore, the device 100 is manufactured from a material that is antibacterial or antimicrobial or the housing component 102 comprises a coating that is antibacterial or antimicrobial.

In another embodiment, the housing component 102 is encased in a silicone material which offers durability and a soft area for a user's mouth, teeth, and lips during use. In one embodiment, the housing component 102 comprises a silicone area 104. In another embodiment, the entire housing component 102 is encased with a silicone material, which also maintains the waterproofness of the device 100 and its components.

Furthermore, the housing component 102 can be molded in various colors and patterns, depending on the needs and/or wants of a user. Typically, the housing component 102 is produced in various fluorescent colors, based upon a user's preference.

Figure 2A:
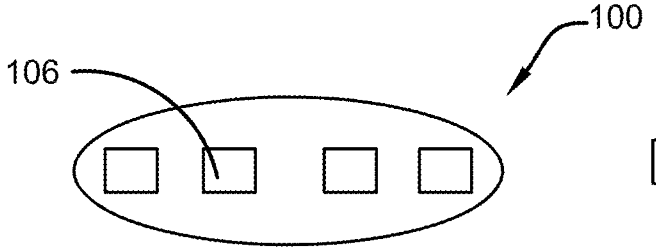
FIGS. 2A-C illustrate a perspective view of one embodiment of the hands-free flashlight device of the present invention showing components of the device in accordance with the disclosed architecture.
Figure 2B:
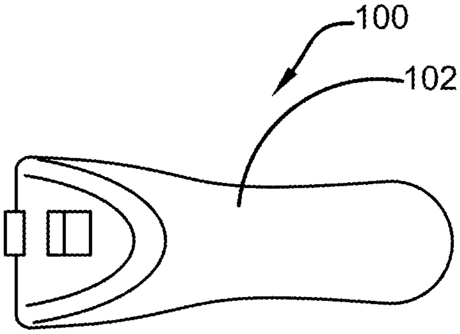
Figure 2C:
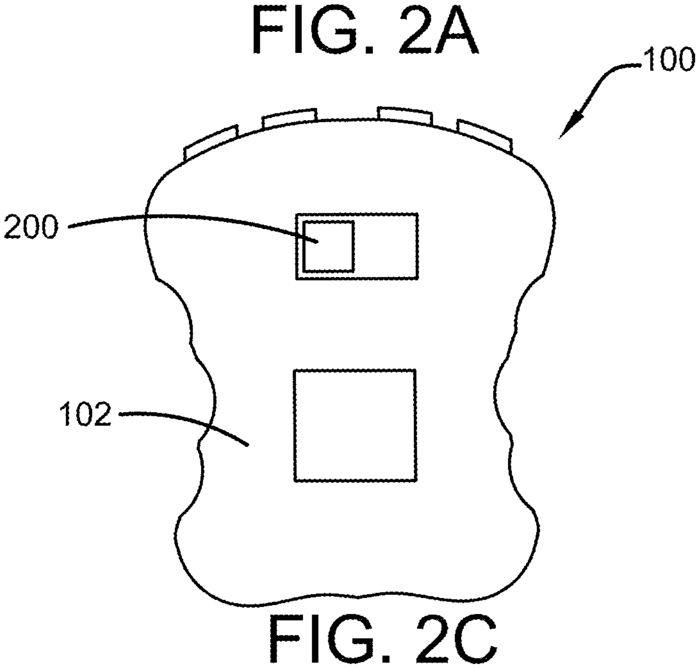

As shown in FIG. 2A-C, the housing component 102 comprises a light bulb 106, a power switch 200, and conducting wires/circuits for illuminating objects with the device 100. Additionally, the light bulb 106 may be an LED light, incandescent, CFL or any other suitable light source capable of operating on a battery charge for a reasonable length of time and generally producing approximately between 40-60 lumens. Typically, the light bulb 106 is at least one LED light, more specifically, there are four LEDs 106 encased within the top side 112 of the housing component 102 to illuminate an area. Further, the LED bulb 106 is actuated by a push or slide button 200 that connects the circuit between the negative side of the battery 202 to the LED bulb 106 that fits against the positive end of the battery 202, to illuminate the LED bulb 106. Thus, the housing component 102 has the ability to generate a light beam in a specific area. Generally, the illuminated end portion directs light to a specific area during use of the hands-free flashlight device 100.

Figure 3:
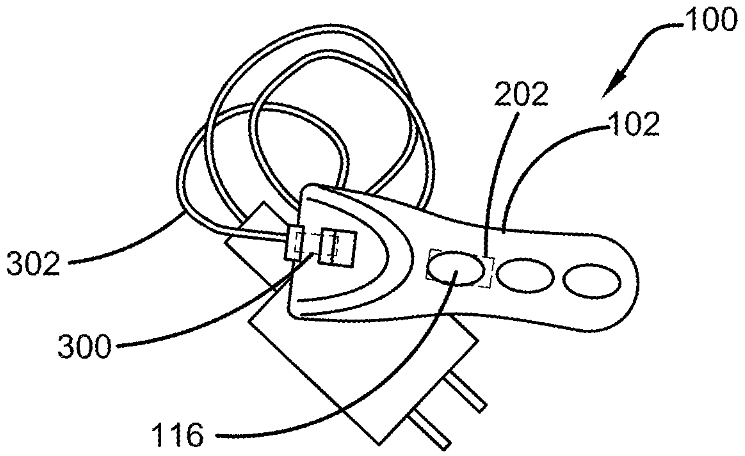
FIG. 3 illustrates a perspective view of one embodiment of the hands-free flashlight device of the present invention showing the device and charge cord in accordance with the disclosed architecture.

As shown in FIG. 3, the housing component 102 comprises an internal battery 202, which may be a standard battery or may be rechargeable. If a rechargeable battery is used, a USB port 300 may be provided to allow the user to plug a charging cable 302 into the port 300 to charge the internal battery 202 as is known in the art. In one embodiment, the USB port 300 automatically closes when the charging cable 302 is unplugged and removed. Thus, when not in use, the housing component 102 can be recharged via the USB port 300 and charging cable 302, as needed. Typically, the USB port 300 can recharge the internal battery 202 and maintain function of the flashlight device 100 throughout several uses before needing recharged again. In another embodiment, the internal battery 202 is a standard battery and can be removed from the housing component 102 and replaced with new batteries 202, as needed.

The battery 202 may be a disposable battery or a rechargeable battery in the form of an alkaline, nickel-cadmium, nickel-metal hydride battery, etc., such as any 3V-12 volts DC battery or other conventional battery, such as A, AA, AAA, etc., that supplies power to the hands-free flashlight device 100. Throughout this specification, the term "battery" may be used interchangeably to refer to one or more wet or dry cells or batteries of cells in which chemical energy is converted into electricity and used as a source of DC power. References to recharging or replacing the battery 202 may refer to recharging or replacing individual cells, individual batteries of cells, or a package of multiple battery cells as is appropriate for any given battery technology that may be used. In addition, a rechargeable embodiment of the battery 202 may be recharged using a USB port 300, wherein the USB port is a USB-A, USB-B, Micro-B, Micro-USB, Mini-USB, or USB-C port, etc.

Figure 4A:
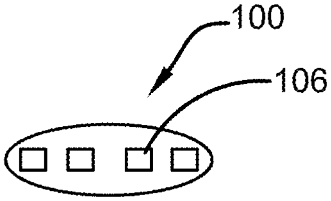
FIGS. 4A-C illustrate a perspective view of one embodiment of the hands-free flashlight device of the present invention showing different views of the device in accordance with the disclosed architecture.
Figure 4B:
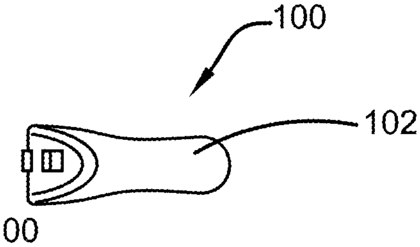
Figure 4C:
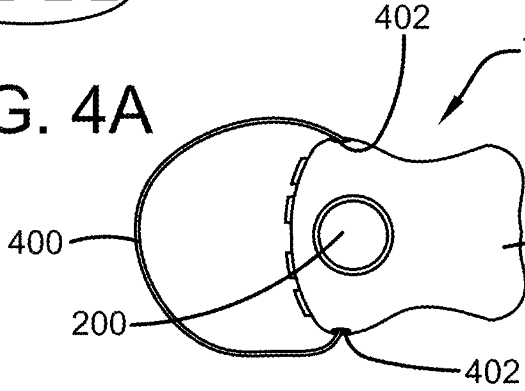

As shown in FIG. 4A-C, the housing component 102 comprises a string 400, strap, lanyard, etc., or any other suitable strap which is secured via being tied to a hole 402 in the housing component 102, glued, adhesives, etc. The string 400 allows a user to hang the flashlight device 100 around a user's neck when not in use, then to place the device 100 in a user's mouth when needed.

In one embodiment, the hands-free flashlight device 100 comprises a magnetic strip 108 or area that is secured via adhesives, glue, etc., to the housing component 102, allowing a user to store the device 100 on a magnetic surface when not in use.

Figure 5:
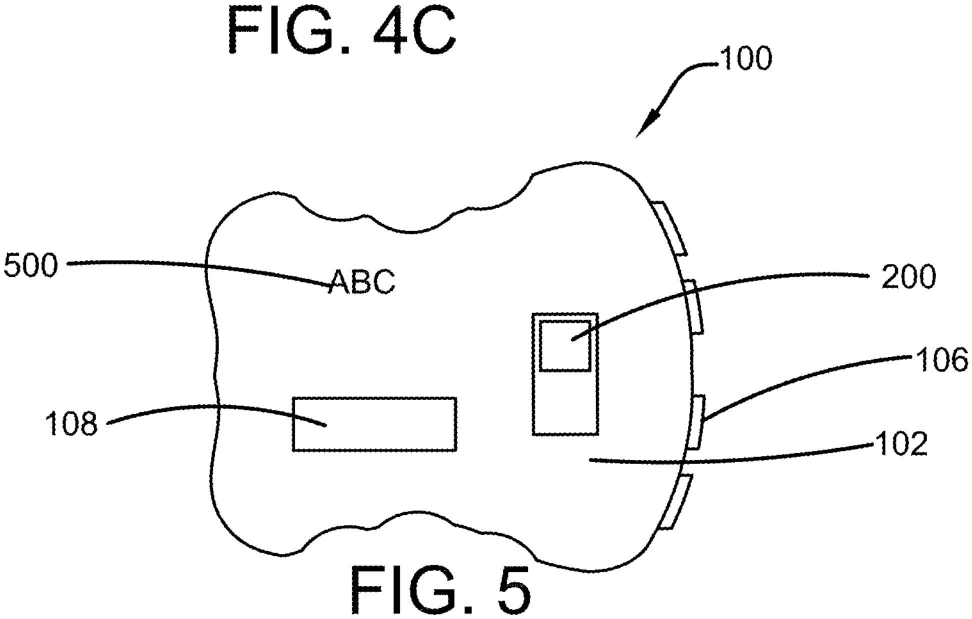
FIG. 5 illustrates a perspective view of one embodiment of the hands-free flashlight device of the present invention showing the power button in accordance with the disclosed architecture.

As shown in FIG. 5, the hands-free flashlight device 100 comprises a plurality of indicia 500. The housing component 102 of the device 100 may include advertising, a trademark, or other letters, designs, or characters, printed, painted, stamped, or integrated into the housing component 102, or any other indicia 500 as is known in the art. Specifically, any suitable indicia 500 as is known in the art can be included, such as but not limited to, patterns, logos, emblems, images, symbols, designs, letters, words, characters, animals, advertisements, brands, etc., that may or may not be flashlight, hands-free, or brand related.

Figure 6:
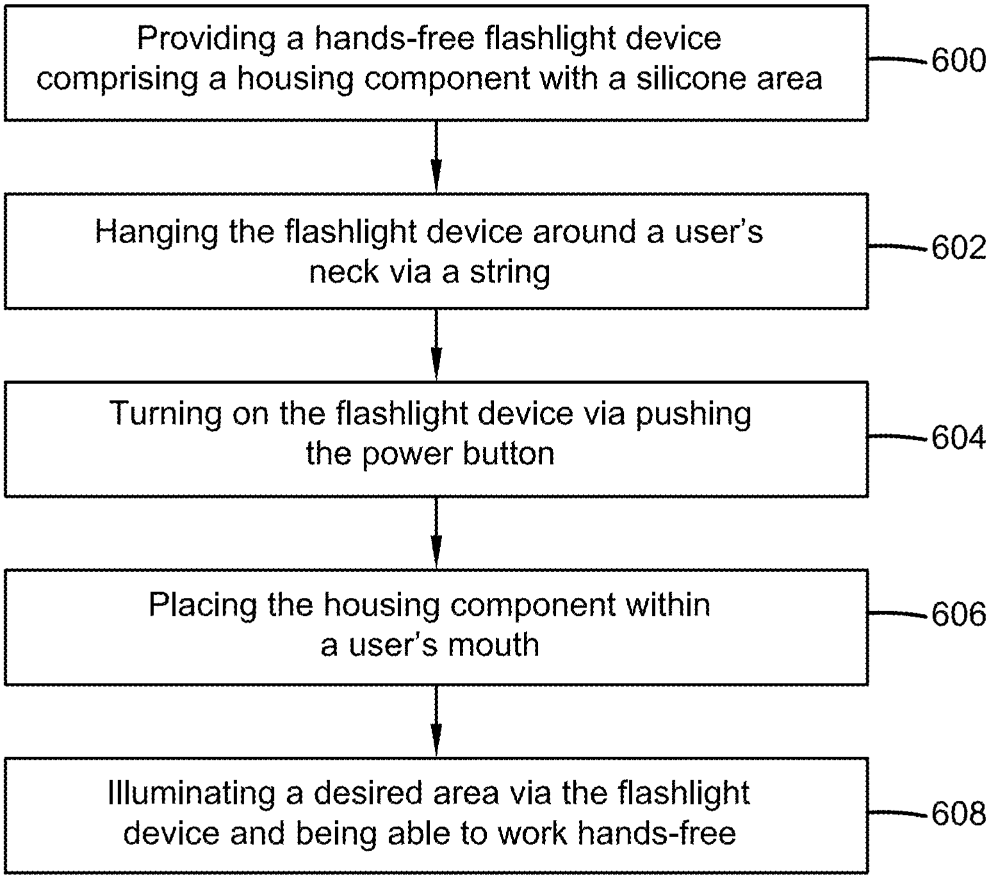
FIG. 6 illustrates a flowchart showing the method of comfortably holding a flashlight in a user's mouth in accordance with the disclosed architecture.

FIG. 6 illustrates a flowchart of the method of comfortably holding a flashlight in a user's mouth. The method includes the steps of at 600, providing a hands-free flashlight device comprising a housing component with a silicone area. The method also comprises at 602, hanging the flashlight device around a user's neck via a string. Further, the method comprises at 604, turning on the flashlight device via pushing the power button. The method also comprises at 606, placing the housing component within a user's mouth. Finally, the method comprises at 608, illuminating a desired area via the flashlight device and being able to work hands-free.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "hands-free flashlight device", "flashlight device", "hands-free device", and "device" are interchangeable and refer to the hands-free flashlight device 100 of the present invention.

Notwithstanding the forgoing, the hands-free flashlight device 100 of the present invention can be of any suitable size and configuration as is known in the art without affecting the overall concept of the invention, provided that it accomplishes the above stated objectives. One of ordinary skill in the art will appreciate that the hands-free flashlight device 100 as shown in FIGS. 1-6 is for illustrative purposes only, and that many other sizes and shapes of the hands-free flashlight device 100 are well within the scope of the present disclosure. Although the dimensions of the hands-free flashlight device 100 are important design parameters for user convenience, the hands-free flashlight device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hands-free flashlight device that provides a user with a flashlight that can be comfortably held in a user's mouth, the hands-free flashlight device comprising:

a housing component;

wherein the housing component comprises a silicone area that allows a user to comfortably place the housing component within their mouths to work hands-free;

wherein the housing component is an elongated and flattened shape, with opposing side ends that are indented inward, such that a user's mouth can easily fit around the housing component;

wherein the housing component comprises opposing top and bottom sides, with the top side sized to be more elongated than the bottom side;

wherein the bottom side includes a dimple for placement of a user's tongue;

wherein the housing component is manufactured of a plastic material and encases flashlight components ensuring the hands-free flashlight device is waterproof;

wherein the housing component is encased in a silicone material which offers durability and a soft area for a user's mouth, teeth, and lips during use; and further wherein the housing component comprises a lighting source for illuminating an object.

2. The hands-free flashlight device of claim 1, wherein the housing component is produced in various fluorescent colors.

3. The hands-free flashlight device of claim 1, wherein the lighting source comprises four LEDs.

4. The hands-free flashlight device of claim 3, wherein the four LEDs are actuated by a push button that connects circuits between the four LEDs and a battery.

5. The hands-free flashlight device of claim 4, wherein the housing component comprises an internal battery, which may be a standard battery or may be rechargeable.

6. The hands-free flashlight device of claim 5, wherein if a rechargeable battery is used, a USB port is provided to allow a user to plug a charging cable into the USB port to charge the internal battery.

7. The hands-free flashlight device of claim 6, wherein the USB port automatically closes when the charging cable is unplugged and removed.

8. The hands-free flashlight device of claim 7, wherein the housing component comprises a string or strap, allowing a user to hang the hands-free flashlight device around a user's neck when not in use.

9. The hands-free flashlight device of claim 8, wherein the housing component comprises a magnetic strip, allowing a user to store the hands-free flashlight device on a magnetic surface when not in use.

10. A hands-free flashlight device that provides a user with a flashlight that can be comfortably held in a user's mouth, the hands-free flashlight device comprising:

a housing component which has an elongated and flattened shape, with opposing side ends that are indented inward, such that a user's mouth can easily fit around the housing component;

wherein the housing component comprises opposing top and bottom sides, with the top side sized to be more elongated than the bottom side;

wherein the bottom side includes a dimple for placement of a user's tongue;

wherein the housing component is encased in a silicone material which offers durability and a soft area for a user's mouth, teeth, and lips during use;

wherein the housing component comprises four LEDs for illuminating an object;

wherein the four LEDs are actuated by a push button that connects circuits between the four LEDs and an internal battery; and further wherein the internal battery is rechargeable via an included USB port.

11. The hands-free flashlight device of claim 10, wherein the housing component comprises a string or strap, allowing a user to hang the hands-free flashlight device around a user's neck when not in use.

12. The hands-free flashlight device of claim 10, wherein the housing component comprises a magnetic strip, allowing a user to store the hands-free flashlight device on a magnetic surface when not in use.

13. The hands-free flashlight device of claim 10, wherein the housing component comprises a coating that is antibacterial or antimicrobial.

14. The hands-free flashlight device of claim 10 further comprising a plurality of indicia.

* * * * *